UNITED STATES PATENT OFFICE.

ANDREW J. POLMETEER, OF WHITEHALL, MONTANA, ASSIGNOR OF TWO-THIRDS TO JOSEPH MITCH AND ALBERTA Q. DYGERT, OF BUTTE, MONTANA.

PRECIPITANT FOR TREATMENT OF COPPER-WATER.

SPECIFICATION forming part of Letters Patent No. 702,244, dated June 10, 1902.

Application filed March 31, 1902. Serial No. 100,865. (No specimens.)

*To all whom it may concern:*

Be it known that I, ANDREW J. POLMETEER, a citizen of the United States, residing at Whitehall, in the county of Jefferson, State of Montana, have invented certain new and useful Improvements in Precipitants for Treatment of Copper-Water, of which the following is a description.

My invention relates to precipitants particularly intended for use in the treatment of what is commonly known as "copper-water," which comes from copper-bearing geological formations—such, for instance, as the water pumped from copper-mines containing copper sulfate in solution. This copper-water is corrosive and rapidly attacks and destroys the metal of the pumps and conducting-pipes used in pumping it from mines, and it has heretofore been found necessary to line the pumps and conducting-pipes with non-metallic material. Not only is such lining expensive, but it fails to fully protect the metal, as the copper-water soon works through it and attacks and corrodes the metal.

It is the object of my invention to provide a precipitant by the use of which the full metallic values of the copper contained in the copper-water shall be precipitated and at the same time the corrosive quality of the resulting liquid holding the precipitate in suspension shall be overcome, so that it may be pumped through unlined metallic pipes without danger of injury to the metal.

With these objects in view and with the further object to provide a precipitant which shall be comparatively inexpensive, my invention consists in the precipitant hereinafter described and claimed.

My precipitant consists of a solution containing a compound of an alkaline metal and sulfur with an excess of free alkali. I prefer to use a solution containing a compound of calcium and sulfur, together with hydrate of calcium, and I prepare this solution by boiling unslaked lime in water in the proportions of four parts of lime to one of sulfur, these ingredients being used in the proportion of twenty ounces of the mixture to a gallon of water. By boiling the mixture in the water for about an hour I find that the lime and sulfur unite to form a soluble sulfid of calcium, probably calcium penta sulfid ($CaS_5$) and calcium thio sulfate, ($CaS_2O_3$,) the excess of lime forming calcium hydrate, $Ca(OH)_2$.

Instead of unslaked lime I may use other alkaline oxids, such as caustic soda.

When the boiling is completed, a clear solution is formed containing the chemical compounds as above stated, and this solution forms the precipitant of my invention. The amount of this solution to be used will vary with the percentage of metallic values contained in the water. For instance, when the water contains forty-six-thousandths per cent. of metallic values to the ton of the copper-water I use one-half ounce of the solution to one gallon of the water to be treated. As the precipitant solution is poured into the copper-water a precipitate is formed somewhat flocculent in character and readily retained in suspension in the liquid. The precipitate contains copper, chiefly in the form of cupric sulfid, ($CuS$,) in combination with some oxids of iron and other metals usually present in the copper-water, and a small proportion of copper oxid, ($CuO$.)

The excess of alkali in the form of calcium hydrate or hydrate of the alkaline metal used neutralizes whatever free acid may be present in the copper-water, and thus prevents corrosive action on any metal with which the liquid may subsequently come in contact.

By allowing the liquid containing the precipitate in suspension to rest for a time in tanks the precipitate will settle, or it may be separated by filtration. The precipitate thus obtained may be treated by smelting or in any other suitable manner to recover the copper therefrom.

The precipitant above described is particularly intended for use in neutralizing the copper-water and precipitating the copper therefrom before pumping it from mines, and the process of treating copper-water for such purpose by the use of such precipitant forms the subject-matter of an application filed by me in the United States Patent Office on January 10, 1902, Serial No. 89,117. It will, however, be understood that the invention of my present application is not restricted to the use of the precipitant at any particular time.

Having thus described my invention, what I claim as new, and desire to secure by Letters Patent of the United States, is—

1. The herein-described precipitant for copper-water, containing in solution a sulfid, and an excess of alkali; substantially as described.

2. The herein-described precipitant for copper-water, containing in solution a sulfid of calcium, and an excess of calcium hydrate; substantially as described.

In testimony whereof I affix my signature in presence of two witnesses.

ANDREW J. POLMETEER.

Witnesses:
JOHN A. MATTHEWS,
PERCY D. PIERCE.